United States Patent
Lu et al.

(10) Patent No.: US 6,754,843 B1
(45) Date of Patent: Jun. 22, 2004

(54) IP BACKBONE NETWORK RELIABILITY AND PERFORMANCE ANALYSIS METHOD AND APPARATUS

(75) Inventors: Leonard L. Lu, Holmdel, NJ (US); David A. Hoeflin, Middletown, NJ (US); Zhuangbo Tang, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 374 days.

(21) Appl. No.: 09/592,339

(22) Filed: Jun. 13, 2000

(51) Int. Cl.[7] .............................................. G06F 11/00
(52) U.S. Cl. ................................ 714/4; 714/1; 714/47; 370/254; 370/238; 709/229
(58) Field of Search .................... 714/47, 4, 1; 370/254, 370/238; 709/224

(56) References Cited

U.S. PATENT DOCUMENTS

| | | | | |
|---|---|---|---|---|
| 6,122,759 A | * | 9/2000 | Ayanoglu et al. | 714/57 |
| 6,292,465 B1 | * | 9/2001 | Vaid et al. | 370/230 |
| 6,298,449 B1 | * | 10/2001 | Carter | 713/340 |
| 6,330,250 B1 | * | 12/2001 | Curry et al. | 370/467 |
| 6,349,091 B1 | * | 2/2002 | Li | 370/238 |
| 6,360,335 B1 | * | 3/2002 | Dawson | 714/39 |
| 6,363,319 B1 | * | 3/2002 | Hsu | 701/202 |
| 6,385,174 B1 | * | 5/2002 | Li | 370/252 |
| 6,421,321 B1 | * | 7/2002 | Sakagawa et al. | 370/238.1 |
| 6,456,599 B1 | * | 9/2002 | Elliott | 370/254 |
| 6,473,404 B1 | * | 10/2002 | Kaplan et al. | 370/238 |
| 6,512,740 B1 | * | 1/2003 | Baniewicz et al. | 370/216 |
| 6,578,077 B1 | * | 6/2003 | Rakoshitz et al. | 709/224 |
| 6,594,265 B1 | * | 7/2003 | Etorre et al. | 370/395.51 |

* cited by examiner

*Primary Examiner*—Scott Baderman
*Assistant Examiner*—Anne L. Damiano

(57) ABSTRACT

This invention provides a tool for reliability evaluation and performance analysis of an IP backbone network by using the network packet loss ratio as the main measurement. A queuing model and algorithm is presented for calculating packet loss at congested interfaces or links. A reliability model is presented for considering network hardware component failures such as router failures, ATM switch failures, and physical link failures. Based on the measurement and models presented, a network reliability and performance (NetRAP) apparatus calculates IP network reliability and performance measurements. The NetRAP apparatus uses the network topology, a traffic matrix, and the reliability parameters of a network as inputs and calculates the network packet loss ratio and sigma score, and provides a list of heavily congested links under non-failure or different single failure conditions.

15 Claims, 5 Drawing Sheets

IP BACKBONE NETWORK RELIABILITY AND PERFORMANCE ANALYSIS METHOD AND APPARATUS

BACKGROUND OF THE INVENTION

1. Field of Invention

This invention relates to a method and apparatus for reliability evaluation and performance analysis of an Internet Protocol (IP) backbone network.

2. Description of Related Art

Currently, in a circuit-switched network, which is connection-oriented, the reliability of the network is measured based on the reliability of T1/T3 circuits, i.e., the percentage that a T1/T3 circuit is fully connected. When a network component fails in the circuit-switched network, it will only affect the T1/T3 circuits served by the failed network component. Each T1/T3 circuit is treated independently when evaluating the impact of a network component failure on the network performance and when analyzing the network outage, such as FCC reportable incidents (based on the lines affected and duration of the outage). The traditional series-parallel reliability block diagram (RBD) model is usually used to analyze the reliability of an individual T1/T3 circuit. On the other hand, a packet-switched IP network introduces reliability issues that do not arise in circuit-switched networks. For example, in addition to the possibility that connectivity may be lost between the network elements, IP networks can introduce the possibility of induced performance degradation during failure conditions, which consumers may perceive as an outage even when connectivity exists. The impact of these perceived outages may not be limited to consumers served by the failed network elements, but may possibly affect the entire population served by the network.

SUMMARY OF THE INVENTION

This invention provides a system and method for reliability evaluation and performance analysis of a backbone network of a large Internet Service Provider (ISP). With given inputs, such as a network topology, the underlying Interior Gateway Protocol (IGP) used, and the traffic matrix collected, a prototype tool, i.e., Network Reliability And Performance (NetRAP), can determine (1) how traffic is routed through the backbone network; (2) which are the congested links in the network; (3) at which interfaces and how many packets are dropped due to congestion or loss of connectivity; (4) the impacts of each single network component failure in terms of packet loss caused by the failure; and (5) how effective is a proposed traffic engineering/capacity planning solution.

By using the input data files in conjunction with the NetRAP apparatus, the NetRAP apparatus is capable of calculating the reliability/performance measurements. The NetRAP apparatus is also capable of listing congested links and identifying critical network components.

The IP network reliability and performance measurements may consist of three parts: 1) accessibility, which is the probability of successfully initiating a transaction into the network; 2) continuity, which is the probability of successfully completing an initiated transaction in the network; and 3) fulfillment, which is the probability that the level of performance in completing a transaction is within acceptable bounds for the provided service, i.e., a quality of service determination.

For an IP backbone network which is bounded at Access Routers (ARs) and Internet Gateway Routers (IGRs), packet transactions start and end at ARs and/or IGRs. Here the packet loss ratio of total incoming packets (TIP) into the network is used as the network reliability/performance measurement. More specifically, the accessibility loss is measured by the packet loss ratio due to disconnection caused by ingress AR/IGR failure. The continuity loss is measured by the packet loss ratio due to disconnection between ingress and egress ARs/IGRs (including the egress AR/IGR failure) under the condition that the ingress AR/IGR is accessible. In addition, the fulfillment is measured by the packet loss ratio due to congestion on interfaces of network links. However, packet loss due to congestion is only part of the fulfillment measurement. Additional measurement for fulfillment such as a packet loss ratio due to network delays (i.e., propagation delay, insertion delay and queuing delay) may also be used.

The present invention concerns a technique for analyzing the performance of an IP backbone network in accordance with the ratio of network packet loss. This loss ratio of the total incoming packets into the network provides a measure of the reliability and performance of the network.

These and other aspects of the invention will be apparent or obvious from the following description.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

The invention is described below in connection with a IP backbone network. That is, as described below, Internet Service Providers are given a framework for the reliability evaluation and for the performance analysis of a backbone network. However, it will be appreciated that the invention can be used with other types of networks, including wired and wireless communication systems, computer, cable, satellite, corporate or other similar networks that are concerned about reliability and performance evaluation.

Figure 1:
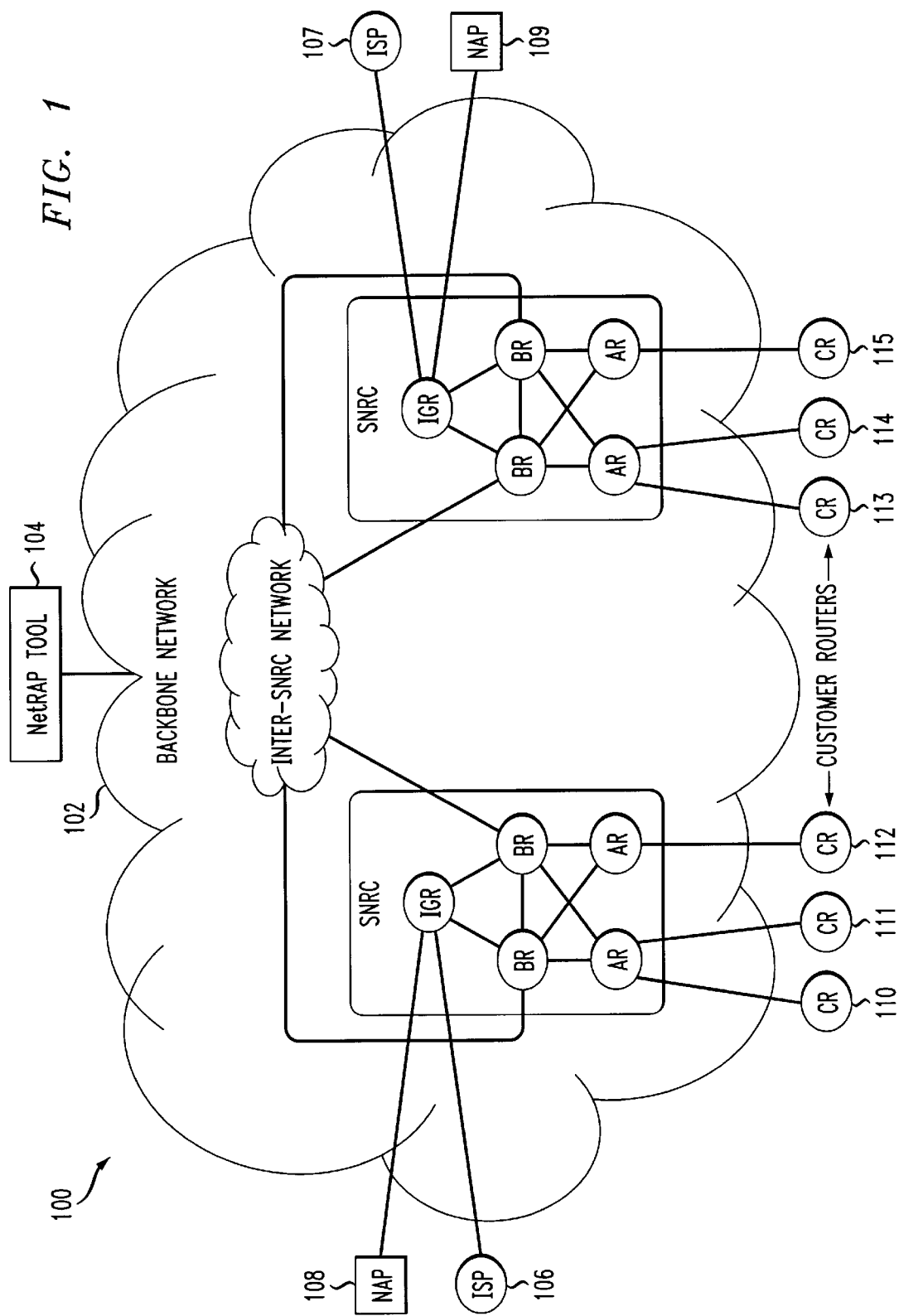
FIG. 1 shows an exemplary diagram of an IP backbone network reliability and performance system in accordance with the present invention.

FIG. 1 shows an exemplary diagram of an IP backbone network reliability and performance (NetRAP) system 100. The IP backbone NetRAP system 100 includes a backbone network 102 having multiple service node router complexes (SNRCs) and an inter-SNRC network. Each SNRC consists of Backbone Routers (BRs), Access Routers (ARs), and possibly Internet Gateway Routers (IGRs). The backbone network 102 is coupled to Internet Service Providers (ISPs) 106, 107, Network Access Points (NAPs) 108, 109, customers routers (CRs) 110–115, and a NetRAP apparatus 104.

Routers within the same SNRC are physically connected to a pair of ATM switches (not shown) such as Ascend C500s via OC-3/OC-12 point-to-point links. For redundancy, each router in the SNRC can have an OC-3/OC-12 connection to each one of the ATM switches. In addition, each AR and IGR is logically connected to the BRs by permanent virtual circuits (PVCs) through such ATM switches.

The IP backbone NetRAP system 100 can be planned as a triple layered network. The first layer can support high-speed connectivity to the customers and provide access to the backbone network 102 using the ARs. The second layer, a backbone layer, supports a wide area interconnection and consists of BRs, which may be connected via DS-3/OC-3/OC-48 inter-SNRC point-to-point links, for example. The third layer, the Internet Gateway Layer, provides "external" connections to the Internet via connections to transit providers, private peers, Internet Service Providers (ISP) 106, 107, and peers located at Network Access Points (NAPs) 108, 109. The IGRs can be used to provide these external connections. To ensure that an SNRC is connected to the backbone even when a single BR fails, each SNRC has at least two BRs. BRs within the same SNRC can be interconnected by PVCs through ATM switches, for example.

The internal routing within the IP backbone NetRAP system 100 can be achieved through a routing protocol called Open Shortest Path First (OSPF). If a network topology, OSPF weights on all links, and a traffic matrix for all pairs of ARs and/or IGRs are established, the OSPF protocol can find the shortest paths between each pair of ARs and/or IGRs. The IP backbone NetRAP system 100 BRs that are interconnected run in an OSPF backbone area called Area 0, while the rest of the ARs and IGRs run in an OSPF area that is associated with the SNRC in which they belong. All links between routers are assigned OSPF weights, and OSPF protocol uses these weights to find the shortest path between each pair of routers (BR, AR, and IGR). When several equal-weight routes to a destination exist, the OSPF protocol distributes the traffic equally among the routes, which is called load balancing.

The NetRAP apparatus 104 provides reliability and performance analysis for the IP backbone NetRAP system 100. The NetRAP apparatus 104 includes a processor (not shown) that executes three input files: 1) a network configuration file which gives the IP backbone network 102 topology; 2) a traffic matrix file which gives traffic volumes between each pair of ARs or IGRs in the IP backbone network 102; and 3) a reliability parameter file which gives failure rate and repair rate of each network component. The NetRAP apparatus 104 calculates all reliability/performance measures by using these input data files and by applying a NetScope tool, for example, to determine the shortest paths between each pair of routers and provide routing information on the shortest paths (NetScope is a tool developed by AT&T Labs-Research which integrates accurate models of topology, traffic, and routing with visualization environment, and provides a variety of IP network measurement and management functions to support traffic engineering in IP networks).

Figure 2:
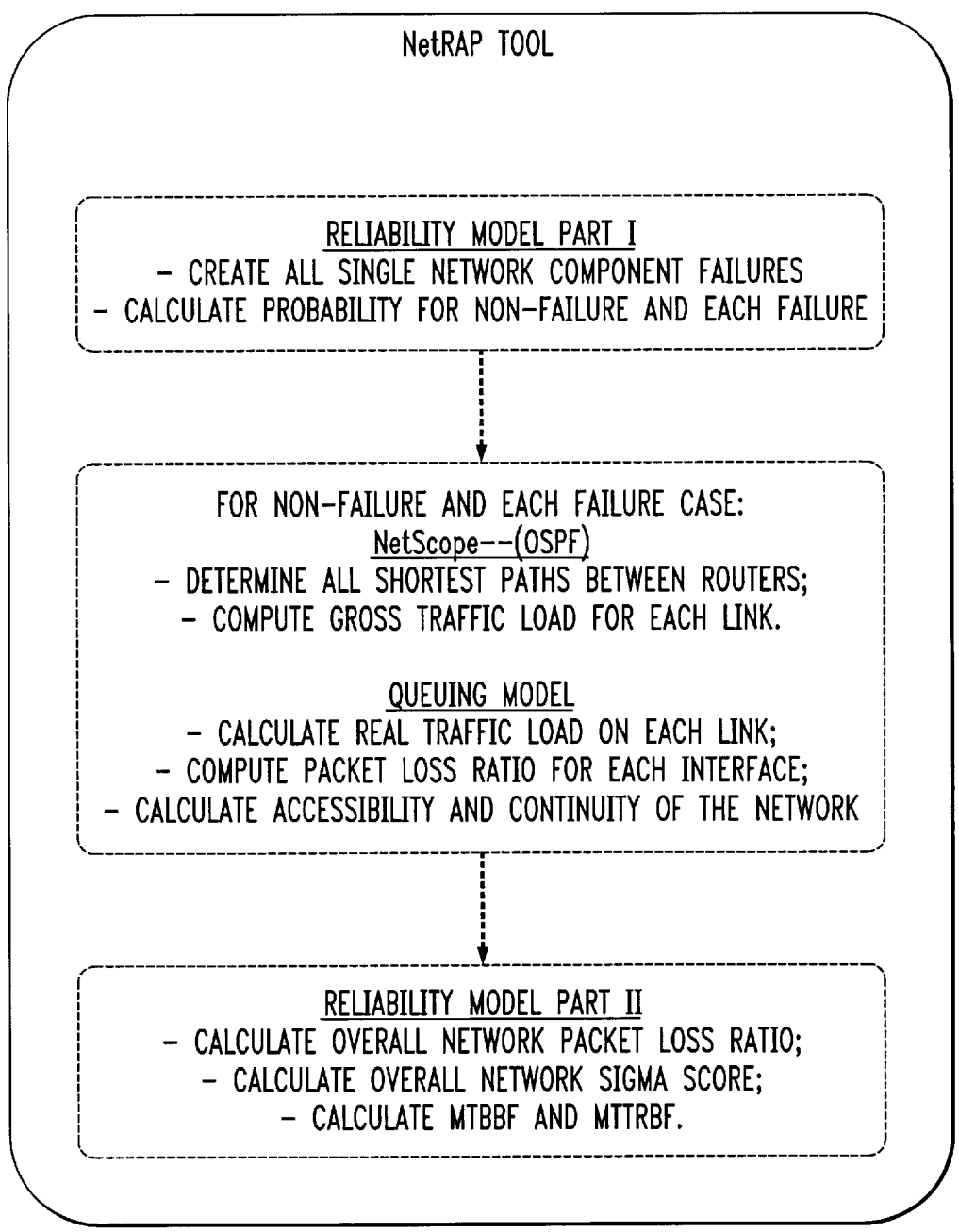
FIG. 2 shows an exemplary process for a network reliability and performance apparatus in accordance with the present invention.

As shown in FIG. 2, the NetRAP apparatus 104 executes a process having three blocks. The first block uses the network topology and reliability parameters as the input data to create all single failure cases and calculates the probability for each failure. For example, the NetRAP apparatus 104 may utilize a Unix machine. In this case, to start the apparatus a user can type NetRAP at the screen cursor prompt. Then, a user can select the type of computation desired, i.e., all single failure cases, an individual single failure case, or a non-failure case. After selecting the computation desired, the user can select a SNRC and the type of failure, i.e., BR, AR, or IGR, to run. After these selections are made, the user will be given a list of performance measures. The user can also be given the option of changing the bandwidth of the congested links.

During the processes of FIG. 2, for each failure case created by the first block, a NetScope tool in the second block uses the network topology and the demand information to determine shortest paths between each pair of routers and computes the gross traffic loads (i.e., the load ignoring the congestion packet loss). This information is then passed to a NetPackLoss algorithm, discussed later, to compute packet loss ratio on each interface and to calculate accessibility and continuity of the network for each failure case.

After evaluating all failure and non-failure cases for the network in the second block, the third block then uses the reliability model to calculate the overall network reliability/performance measurements, including the overall packet loss ratio, the overall network sigma score, and the mean time between "bad" (low sigma score) failures (MTBBF) and the mean time to repair "bad" failures MTTRBF. MTBBF and MTTRBF are a pair of reliability measures. The network sigma score can be determined, for example, by a six-sigma approach which is a method for measuring quality of performance using the notion of Defects per Million (DPM).

The IP network reliability/performance measurement consists of three parts: 1) accessibility, which is the probability of successfully initiating a transaction into the network; 2) continuity, which is the probability of successfully completing an initiated transaction in the network; and 3) fulfillment, which is the probability that the level of performance in completing a transaction is within acceptable bounds for the provided service. The packet loss ratio of total incoming packets into the network can be used as the network reliability/performance measurement. More specifically, the accessibility loss is measured by the packet loss ratio due to disconnection caused by ingress AR/IGR failure. The continuity loss is measured by the packet loss ratio due to disconnection between ingress and egress ARs/IGRs (including the egress AR/IGR failure) under the condition that the ingress AR/IGR is accessible. The fulfillment is measured by the packet loss ratio due to congestion on interfaces of network links.

For example, if TIP is the number of total incoming packets in the backbone network 102, and t(x, y) is the amount of traffic from the ingress router (AR or IGR) x to the egress router (AR or IGR) y, then the accessibility loss of the backbone network 102 can be calculated as follows:

$$\text{Accessibility Loss} = \frac{1}{TIP} \sum_{x \text{ unaccessible}} t(x, y) \qquad (1.1)$$

To calculate the continuity loss, the routing protocol OSPF can be used to identify pairs of ARs and/or IGRs that are disconnected when a network component fails. If DISR is the set of all the disconnected router pairs, then the continuity loss of the backbone network 102 is given by $$\text{Continuity Loss} = \frac{1}{TIP} \sum_{\substack{(x,y) \in DISR \\ x \text{ unaccessible}}} t(x, y) \quad (1.2)$$

To calculate the fulfillment, if INF is the set of all interfaces of the backbone network 102 and cpl(i) is the congestion packet loss on the interface i, then we can have $$\text{Fulfillment} = 1 - \frac{1}{TIP} \sum_{i \in INF} cpl(i) \quad (1.3)$$

For each interface i, the value of cpl(i) is determined by the packet buffer size of the interface and the traffic load on the link of that interface. Since the traffic load on a link depends upon the traffic flow on other links, the value of cpl(i) cannot be calculated separately for each interface. A queuing model and algorithm to calculate cpl(.) values of all interfaces in the IP backbone network 102 simultaneously is developed for this scenario.

As discussed above, the IP backbone network 102 uses the routing protocol OSPF to route the internal traffic. Given the network topology, OSPF weights on all links, and the traffic matrix for all pairs of ARs and/or IGRs, the OSPF can find the shortest paths between each pair of ARs and/or IGRs and use load balancing to determine the traffic volumes on these paths. However, due to congestion on the interface of each link, the real traffic volume on a path will differ from the value determined by OSPF. Furthermore, the real traffic volume on a path will not be constant from the beginning of the path to the end of that path. The traffic volume will be adjusted as the path passes through one link to the next link, and the amount of the adjustment will depend on the congestion packet loss ratio on the interface of that link. If SP is the set of all shortest paths determined by OSPF for the IP backbone network 102, v(s) is the traffic volume determined by OSPF on a shortest path s, plr(s, i) is the packet loss ratio on the i-th link of the path s, and v(s, i) is the real traffic volume when the path s passes through its i-th link, then the values of v(s, i) can be calculated as follows:

$$v(s,i) = (1 - plr(s,i)) \, v(s, i-1), \, i = 1, 2, \ldots, n(s), \quad (1.4)$$

where $v(s,0) = v(s)$ and n(s) is the number of links on the path s. The packet loss ratio on the interface of a link is determined by the traffic load and the buffer size on that interface, where the traffic load is equal to the summation of the real traffic volume of all shortest paths passing through this link. Several standard queuing models can be used to calculate the congestion packet loss ratio on the interface of a link. The simplest queuing model that can be used here is the classical M/M/1/K model, which uses the following formula to calculate the packet loss ratio:

$$\text{packet loss ratio} = \begin{cases} \frac{1-\rho}{1-\rho^{K+1}} \rho^K, & \rho \neq 1 \\ \frac{1}{K+1}, & \rho = 1 \end{cases} \quad (1.5)$$

where $\rho$ is the utilization of the link, i.e., $\rho$=traffic load/bandwidth of the link, and K is the buffer size.

Figure 3:
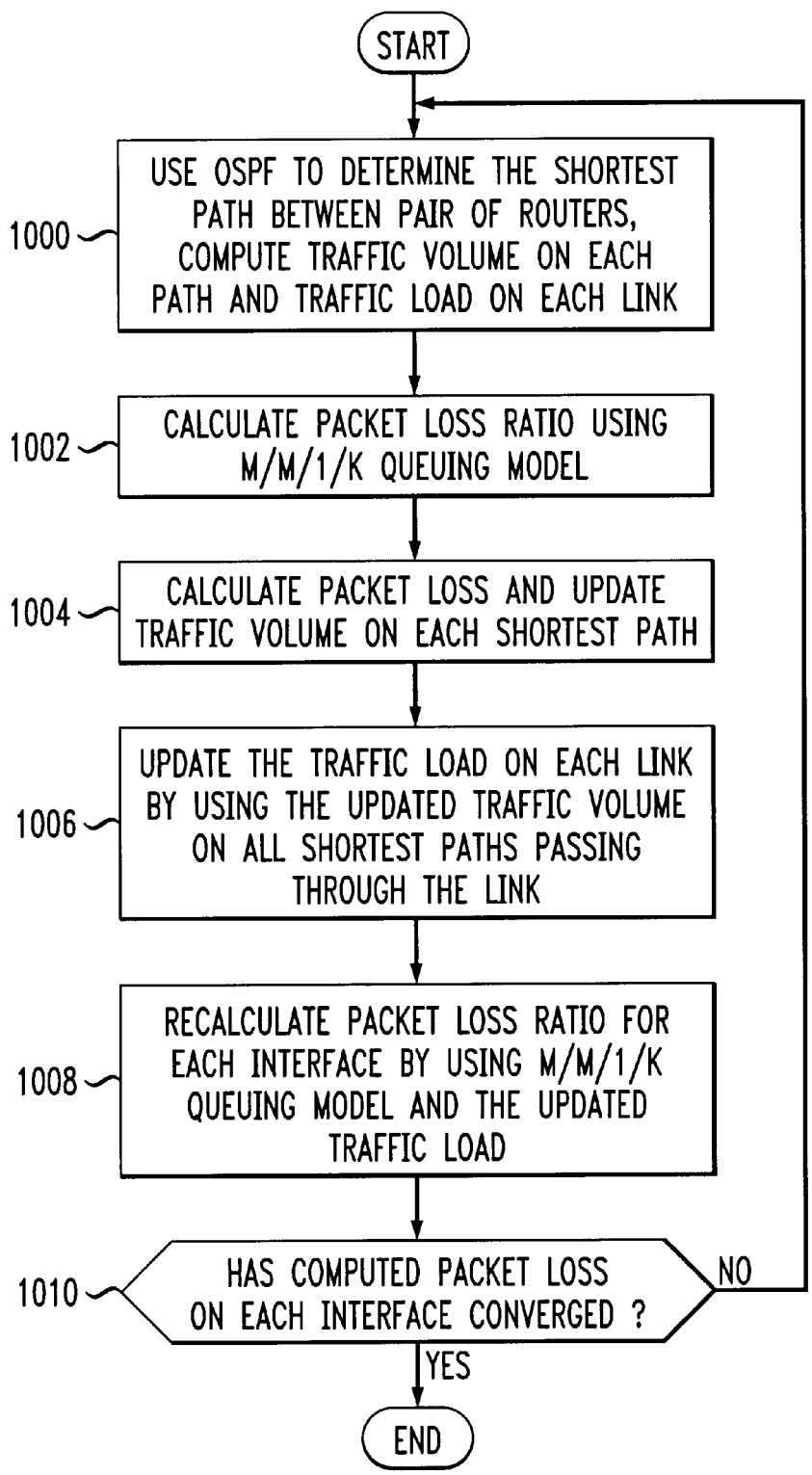
FIG. 3 shows a flowchart of an exemplary process for determining a NetPackLoss algorithm for network packet loss in accordance with the present invention.

In order to calculate packet loss ratio, the real traffic on the shortest paths needs to be known. To determine the real traffic on a shortest path, the packet loss ratios need to be known. That is, these two sets of values are correlated to each other and they should be determined simultaneously. In FIG. 3 an algorithm is developed to overcome the difficulty of these simultaneous calculations.

FIG. 3 shows a flowchart of an exemplary process for determining the NetPackLoss algorithm for network packet loss. In step 1000, the shortest path is determined between a pair of routers by using the OSPF protocol. The NetPackLoss algorithm takes the path traffic volumes v(s) determined by the OSPF protocol as the initial values to determine the traffic load on all links. In step 1002, the NetPackLoss algorithm uses the M/M/1/K queuing model noted above to calculate the packet loss ratio. In step 1004, the v(s,i) expression is applied to update the traffic volume on each shortest path. In step 1006, the NetPackLoss algorithm then uses the updated traffic volume on all shortest paths to update the traffic load on all links. In step 1008, the NetPackLoss algorithm recalculates the packet loss ratio for each interface using the M/M/1/K queuing model and the updated traffic load. The NetPackLoss algorithm terminates when the computed packet loss on each interface converges. Otherwise, the process returns to step 1000. In most cases, the NetPackLoss algorithm converges within two or three iterations, with five iterations typically being the longest.

Figure 4:
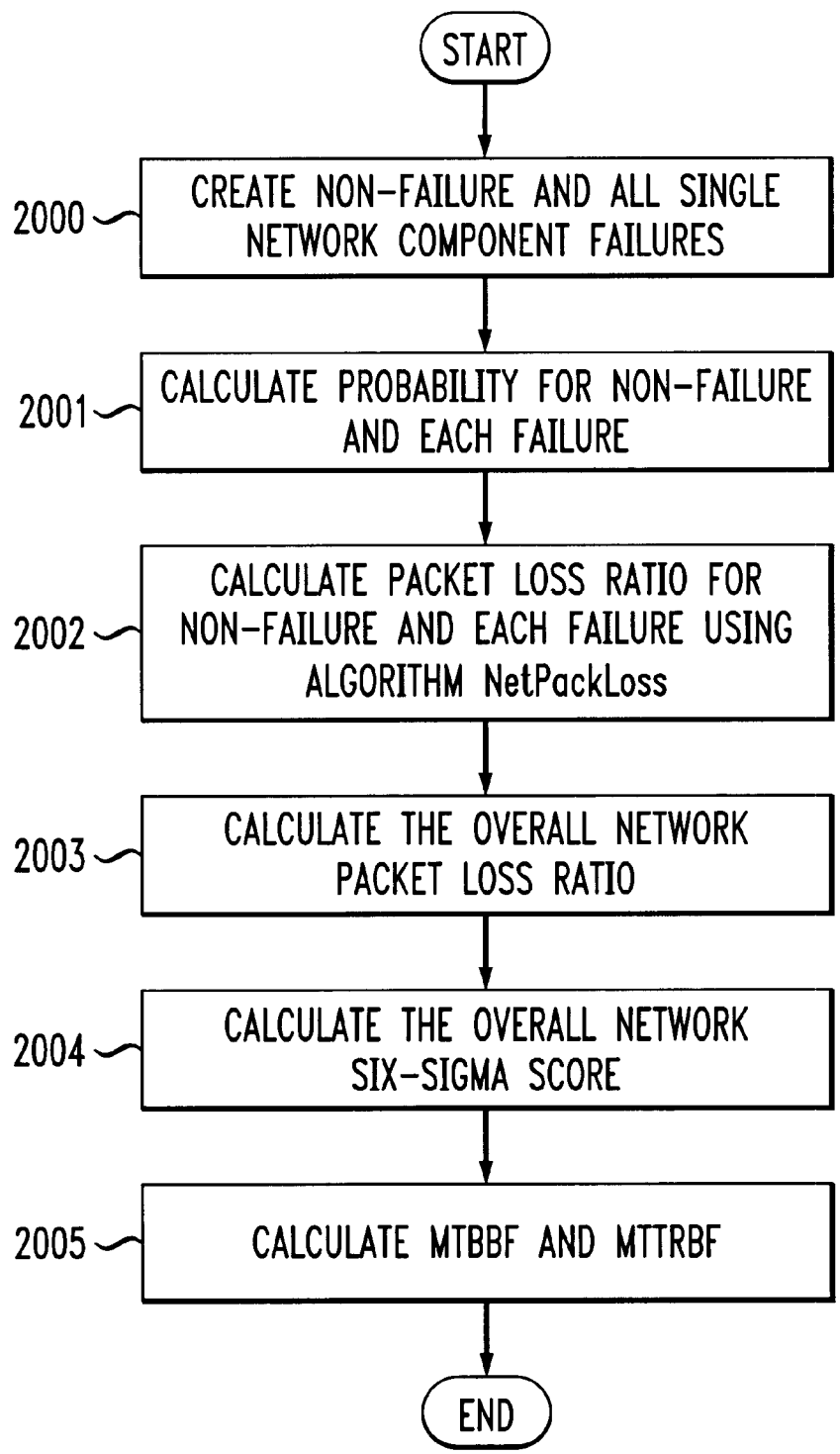
FIG. 4 shows a flowchart of an exemplary process for a reliability model for an IP backbone network in accordance with the present invention.

FIG. 4 shows a flowchart of an exemplary process for a reliability model for the IP backbone network 102. The reliability model for the IP backbone network 102 takes into consideration the network hardware component failures such as router failures, ATM switch failures, and physical link failures. At the inter-SNRC level, both physical and logical connections are the same. At the intra-SNRC level, the physical connections are, for example, OC-3/OC-12 links connecting routers (BRs, ARs, and IGRs) with ATM switches, while the logical connections are PVCs connecting BRs with BRs/ARs/IGRs.

There are two different techniques that can be used to develop the reliability model: (1) the traditional series-parallel reliability block diagram (RBD) technique and (2) the Markov modeling technique. Compared with the RBD technique, the Markov modeling is a more flexible and powerful technique which is useful in doing quantitative reliability analysis. The Markov modeling technique has the ability to handle a state dependent failure rate and repair rate, a failure switchover process, and cold standby systems. This technique can also handle systems with non-exponential distributions for detection, maintenance, and/or repair times.

The first part of the reliability model in FIG. 4 is a Markov model that takes the network topology (SNRCs, routers, interfaces, and links) and the reliability parameters of each component (failure rate and repair rate) as the input. In step, 2000, the model creates non-failure and all single network component failure scenarios. In step 2001, the probability for each failure scenario is calculated. When considering only single failures of routers and physical links, the state space of the Markov model consists of only non-failure and single failure cases. In step 2002, the packet loss ratio for a non-failure and for each single failure using the NetPackLoss algorithm is calculated.

If F is the set of non-failure and all failure scenarios under consideration, Q is the generator matrix in the Markov model (which can be determined by the failure rates and repair rates of all failure scenarios), and Pr(f) is the limiting (long run) state probability of the failure case f, then the values of all Pr(f)'s can be computed by solving the following linear equations:

$$\begin{cases} (Pr(f_1), Pr(f_2), \ldots )Q = 0 & (1.6) \\ \sum_{f \in f} Pr(f) = 1 \end{cases}$$

In step 2003, the overall network packet loss ratio (from disconnection and congestion) is calculated. Then in step 1004, the overall network six-sigma score is calculated. If Pr(f) is the probability for the failure case f given by the equations (1.6), acc_loss(f), con_loss(f), and ful(f) is the network accessibility loss, continuity loss, and fulfillment for the failure case f given by the expressions (1.1), (1.2), and (1.3), respectively. Then the overall network packet loss ratio is the weighted summation of network packet loss ratio over non-failure and all failure scenarios, i.e., Overall Network Packet Loss Ratio = (1.7)

$$\sum_{f \in f} [\text{acc\_loss}(f) + \text{con\_loss}(f) + 1 - \text{ful}(f)] Pr(f)$$

The six-sigma approach is a method for measuring quality of performance using the notion of Defects per Million (DPM). For the IP backbone network 102, packet loss (from disconnection and congestion) is used as the defect. Thus, 1 DPM=0.0001% of a packet loss ratio. A six-sigma network has only 3.4 DPM which is extremely reliable in the service, while a two-sigma network has more than 300 K DPM (30% of packet loss ratio) which means that the entire network is almost down.

The calculation of the six-sigma score is based on a normal probability distribution. If OPLR is the overall network packet loss ratio given in the expression (1.7), $\Phi(.)$ is the cumulative distribution function (cdf) of the normal distribution, and $\Phi^{-1}(.)$ is the inverse function of $\Phi(.)$, then overall network sigma score is given by Overall Network Sigma Score=min ($\Phi^{-1}$(OPLR)+1.5,6)   (1.8)

For the non-failure scenario and for most of the failure scenarios, the network has very low packet loss ratios and high sigma scores. However, when some critical routers/links fail, the network will have high packet loss ratios and low sigma scores. Thus, another pair of important reliability measures are the mean time between "bad" (low sigma score) failures (MTBBF) and the mean time to repair "bad" failures (MTTRBF).

In step 2005, MTBBF and MTTRBF are calculated. If MTTR(f) is the mean time to repair for the failure case f and F(x) is the set of all failure cases with at least x sigma score below the non-failure case (say x=1), then values of MTBBF and MTTRBF can be calculated as follows:

$$MTTRBF = \frac{\sum_{f \in F(x)} MTTR(f) Pr(f)}{\sum_{f \in F(x)} Pr(f)} \quad (1.9)$$

$$MTBBF = MTTRBF \frac{1 - \sum_{f \in F(x)} Pr(f)}{\sum_{f \in F(x)} Pr(f)} \quad (1.10)$$

Then the process ends after step 2005.

Figure 5:
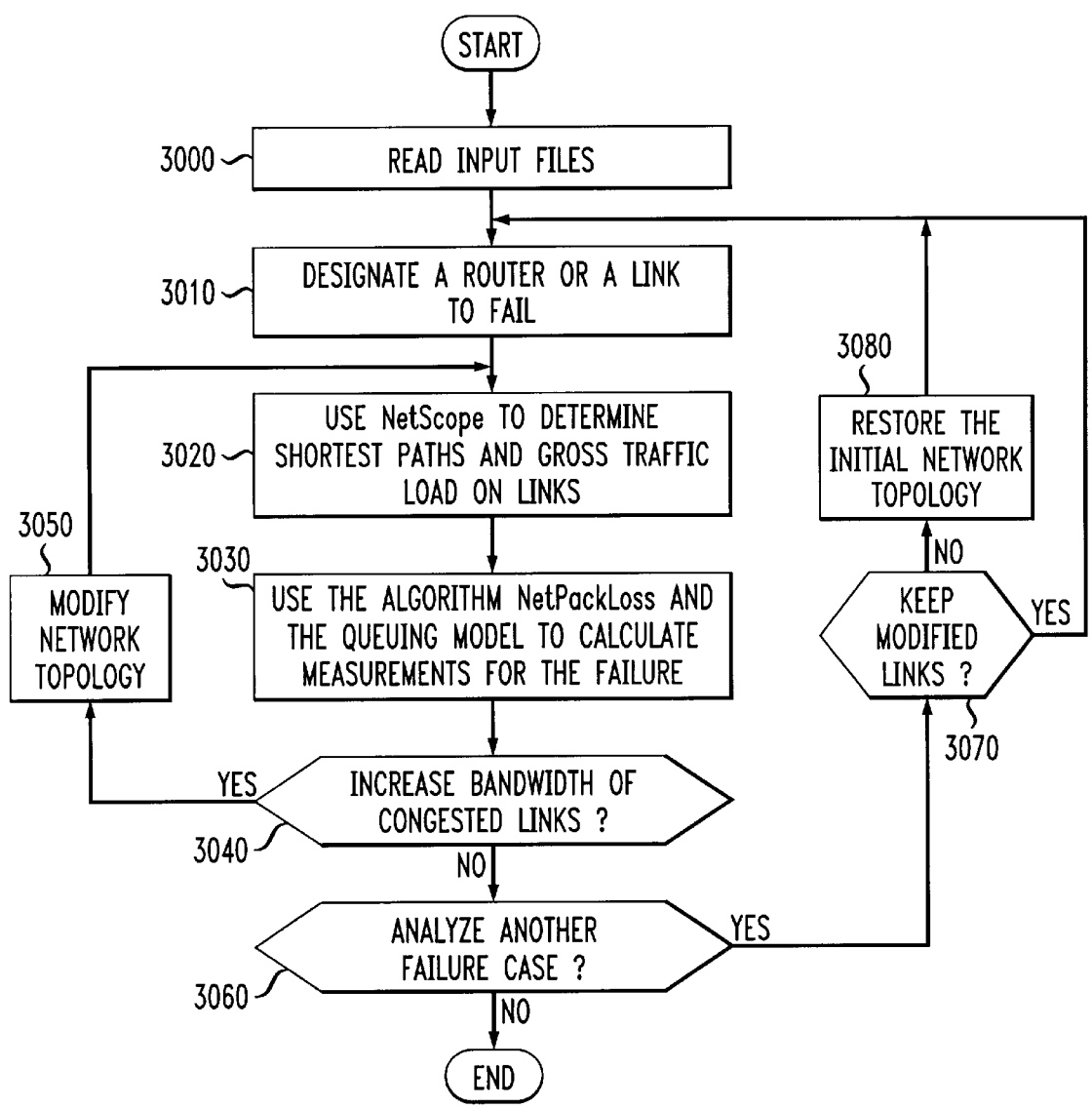
FIG. 5 shows a flowchart of an exemplary process of the network reliability and performance apparatus in accordance with the present invention.

FIG. 5 shows a flowchart of an exemplary process of the network reliability and performance (NetRAP) apparatus. In addition to computing the overall network reliability/performance benchmark, the process for the NetRAP apparatus can also analyze an individual failure or non-failure case, and provide "what if" function for modifying the link bandwidth. The NetRAP apparatus 104 is able to find possible solutions for better traffic engineering or capacity planning. The NetRAP apparatus 104 is applicable for: (1) locating congested links for non-failure situations and for evaluating the impact of increasing the bandwidth of congested links on the network performance; and for (2) locating congested links for a specified single failure case and for evaluating the impact of increasing the bandwidth of congested links on the network performance.

FIG. 5 shows the flowchart for applying the processes of the NetRAP apparatus to these applications. In step 3000, input files, network configuration and demand files are read. Then in step 3010, the user specifies to run the apparatus for the non-failure case or a single failure case by indicating which router or link is to fail. In step 3020, NetScope is used to determine the shortest paths and the gross traffic load on the links.

In step 3030, the NetRAP apparatus 104 will then use the NetPackLoss algorithm and the queuing model to calculate the following measurements: (1) network packet loss ratio (from disconnection and congestion) and sigma score; (2) packet loss distribution over ARs and IGRs at the failure; and (3) a list of heavily congested links with information such as packet loss ratio and throughput of the link, and percentage of load on the link over non-failure case.

In step 3040, the NetRAP apparatus 104 then asks whether the user wants to increase the bandwidth(s) of the congested link(s). If the user wants to increase the bandwidth, then the NetRAP apparatus goes to step 3050 and modifies the link information in the network topology file, and recalculates all the output information. Then the process jumps back to step 3020. Otherwise, the NetRAP apparatus goes to step 3060 and asks the user if another failure case should be analyzed.

If no other failure case is to be analyzed, the process ends. Otherwise, the process goes to step 3070 where a determination is made as to whether the user wants to keep the previously increased link bandwidth(s). If the user wants to keep the modified links, the process jumps back to step 3010. Otherwise, the process goes to step 3080 where the initial network topology is restored. Then the process jumps back to step 3010.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for providing overall reliability evaluation and performance analysis of an IP backbone network, the method comprising:

reading input data;

determining shortest paths between each pair of routers, and computing an overall network reliability and performance benchmark based on the input data and the determined shortest paths, wherein the computing step includes calculating an accessibility loss, a continuity loss and a fulfillment of the network.

2. The method of claim 1, wherein the accessibility loss is measured by a packet loss ratio due to a disconnection caused by an ingress AR/IGR failure, the continuity loss is measured by a packet loss ratio due to disconnection between an ingress and an egress AR/IGR under the condition that the ingress AR/IGR is accessible, and the fulfillment is measured by a packet loss ratio due to congestion on interfaces of network links.

3. A method for providing overall reliability evaluation and performance analysis of an IP backbone network, the method comprising:

reading input data;

determining shortest paths between each pair of routers, and computing an overall network reliability and performance benchmark based on the input data and the determined shortest paths, wherein the computing step includes calculating a sigma score.

4. A method for providing overall reliability evaluation and performance analysis of an IP backbone network, the method comprising:

reading input data;

specifying a router or link to fail;

determining shortest paths between each pair of routers;

determining a gross traffic load on the links;

analyzing at least one specified failure or a non-failure case based on the input data, determined shortest paths and the determined gross traffic load; and providing decision functions for modifying a link bandwidth based on the analyzed failure or non-failure.

5. The method of claim 4, wherein the decision function includes locating congested links for non-failure situations and evaluating an impact of increasing the bandwidth of the congested links.

6. The method of claim 4, wherein the decision function includes locating congested links for the at least one specified failure and evaluating an impact of increasing the bandwidth of the congested links.

7. A storage medium comprising information for providing overall reliability and performance analysis of an IP backbone network, comprising:

a program for reading input data;

a program for specifying a router or link to fail;

a program for determining shortest paths between each pair of routers;

a program for determining a gross traffic load on the links;

a program for analyzing at least one specified failure or a non-failure case based on the input data, the determined shortest paths and the determined gross traffic load; and a program for providing decision functions for modifying a link bandwidth based on the analyzed failure or non-failure.

8. The storage medium of claim 7, wherein the decision function information includes location of congested links for non-failure situations and an evaluation of an impact of increasing the bandwidth of the congested links.

9. The storage medium of claim 7, wherein the decision function information includes location of congested links for the at least one specified failure and an evaluation of an impact of increasing the bandwidth of the congested links.

10. An IP backbone network reliability evaluation and performance analysis apparatus, comprising:

means for determining shortest paths between each pair of routers; and a tool for reading input data and computing an overall network reliability and performance benchmark based on the input data and the determined shortest paths, wherein the tool calculates an accessibility loss, a continuity loss and a fulfillment of the network.

11. The apparatus of claim 10, wherein the accessibility loss is measured by a packet loss ratio due to a disconnection caused by an ingress AR/IGR failure, the continuity loss is measured by a packet loss ratio due to disconnection between an ingress and an egress AR/IGR under the condition that the ingress AR/IGR is accessible, and the fulfillment is measured by a packet loss ratio due to congestion on interfaces of network links.

12. An IP backbone network reliability evaluation and performance analysis apparatus, comprising:

means for determining shortest paths between each pair of routers; and a tool for reading input data and computing an overall network reliability and performance benchmark based on the input data and the determined shortest paths, wherein the tool calculates a sigma score.

13. An IP backbone network reliability evaluation and performance analysis apparatus, comprising:

means for specifying a router or link to fail;

means for determining shortest paths between each pair of routers;

means for determining a gross traffic load on the links; and a tool for analyzing at least one specified failure or a non-failure case based on the input data, determined shortest paths and the determined gross traffic, load, wherein the tool provides decision functions for modifying a link bandwidth based on the analyzed failure or non-failure.

14. The apparatus of claim 13, wherein the decision functions includes locating congested links for non-failure situations and evaluating an impact of increasing the bandwidth of the congested links.

15. The apparatus of claim 13, wherein the decision functions includes locating congested links for the at least one specified failure and evaluating an impact of increasing the bandwidth of the congested links.

* * * * *